Oct. 31, 1961   A. SARTI   3,006,181
GATE VALVE LOCKING DEVICE
Filed May 15, 1958

INVENTOR
Albert Sarti
BY
ATTORNEY

United States Patent Office 3,006,181
Patented Oct. 31, 1961

3,006,181
GATE VALVE LOCKING DEVICE
Albert Sarti, Sacramento, Calif., assignor to Perkins Welding Works, Sacramento, Calif.
Filed May 15, 1958, Ser. No. 735,513
1 Claim. (Cl. 70—180)

This invention relates to a locking device designed for locking gate valves installed in pipe lines for controlling the flow of fluid therethrough.

An important object of the invention is to provide means which may be readily installed during the assembling of the pipe line, whereby a conventional padlock may be used to lock the gate valve with which the device is used in a predetermined set position against operation by unauthorized persons.

A further object of the invention is to provide a locking device for locking a hand operated gate valve, which may be mounted in a pipe line after the pipes of the pipe line have been assembled making it unnecessary to disconnect pipes of the system to install the valve lock.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing.

Figure 1:
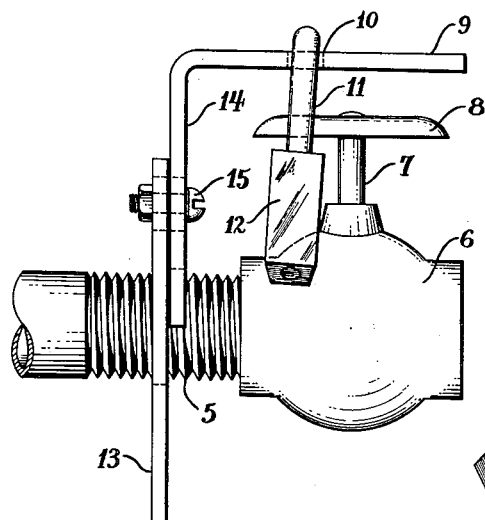
FIGURE 1 is a view of a detachable gate valve locking device constructed in accordance with the invention.
Figure 2:
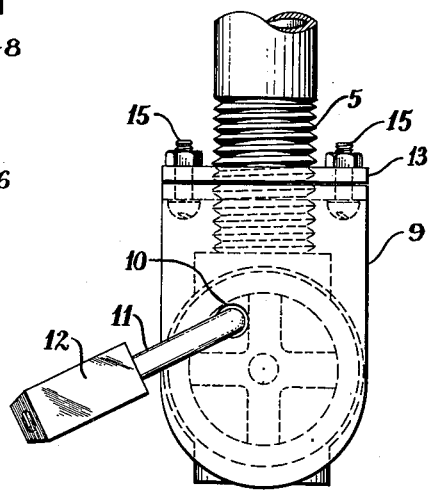
FIG. 2 is a plan view thereof.
Figure 3:
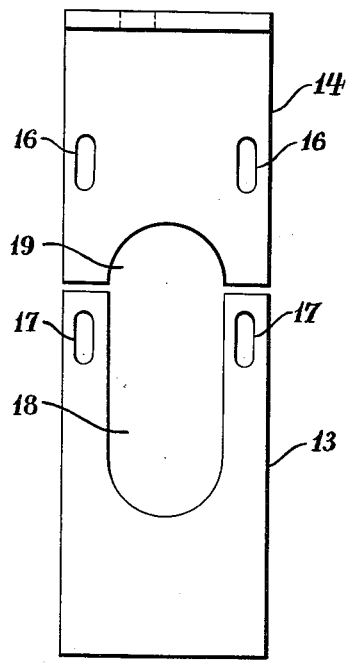
FIG. 3 is an exploded view showing the locking plates as disconnected prior to positioning on a pipe for locking a gate valve.

Referring to the drawing in detail, the reference character 5 indicates a pipe line in which the gate valve housing 6 is mounted, the gate valve stem being indicated by the reference character 7.

The reference character 8 indicates a hand wheel connected to the valve stem 7, over which the locking plate 9 of the valve lock extends, the locking plate 9 having an opening 10 through which the hasp 11 of the padlock 12 extends, the hasp also extending between spokes of the handwheel 8 preventing movement of the handwheel to operate the gate valve.

Cooperating with the plate 9 is a main plate section 13 that is connected to the right-angled end 14 of the locking plate 9, the plate 13 being secured to the right-angled end 14 by means of the bolts 15 that are disposed in registering openings 16 and 17 of said plates 9 and 13.

The plate 13 is formed with a cutout portion 18 extending inwardly from one end thereof, while the right-angled end 14 of plate 9 is provided with a cutout portion 19 extending inwardly from the end thereof. These cutout portions 18 and 19 permit the plates 13 and 9 to be positioned over a pipe and secured in position adjacent to the operating handle of a gate valve for receiving a padlock for locking the gate valve in a predetermined set position against operation by unauthorized persons.

Figure 4:
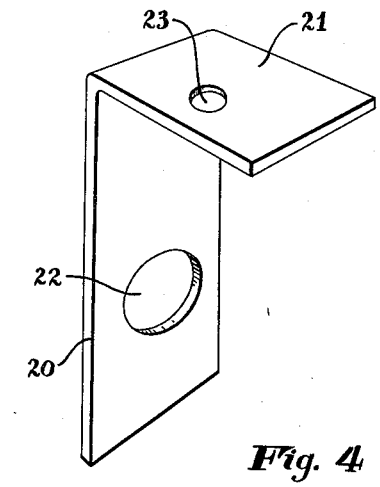
FIG. 4 is a perspective view of an alternate form of locking plate.

As shown by FIG. 4 of the drawing, there is illustrated an alternate form of locking plate that comprises a main section 20 and a right-angled upper end plate 21, the angle plate 20 having an opening 22 to permit it to be permanently installed on a pipe of a pipe line adjacent to the gate valve thereof, so that the upper right-angled end plate 21 overlies the handwheel used for effecting operation of the gate valve. It is realized in this alternate plate that its upper end plate 21 is equivalent to plate 9 in FIG. 1 and that opening 23 is equivalent to opening 10 in the stated plate 9.

In this form of the invention, the right-angled end 21 is provided with an opening 23 which when the locking plate has been properly positioned, will lie directly above the valve handwheel for the reception of a padlock hasp locking the valve against unauthorized persons tampering with the valve after it has been set.

From the foregoing it will be seen that due to the construction shown and described, I have provided means for securely locking gate valves against operation by unauthorized persons, thereby insuring the desired flow of fluid through a pipe line for which the valve has been set.

Having thus described the invention, what is claimed is:

A gate valve locking device for gate valves in pipe lines operable by hand wheels comprising, a first rectangular plate having an elongated cut-out portion with a semi-circular lower end positioned symmetrically with respect to its longitudinal axis and adapted to receive the pipe of the pipe line and having elongated openings therein on the opposite sides of the elongated cut-out portion and parallel to the latter, a second right angle plate having elongated openings in one arm positioned on the opposite sides of the longitudinal center line of the latter and alignable with the elongated openings in the first plate and having its other arm adapted to overlie the hand wheel of the gate valve and a hole therein adapted to receive the hasp of a padlock also passing through a space between adjacent spokes of the hand wheel, and machine screws in the aligned elongated openings in the plates.

References Cited in the file of this patent
UNITED STATES PATENTS

| | | |
|---|---|---|
| 691,986 | Toback | Jan. 28, 1902 |
| 1,590,032 | Jauch | June 22, 1926 |
| 1,615,181 | Swacker | Jan. 18, 1927 |
| 1,683,649 | Belote | Sept. 11, 1928 |
| 2,161,626 | Loughner | June 6, 1939 |